Jan. 9, 1934.  G. A. BIGGS  1,942,995

HYDRAULIC TURBINE

Filed June 21, 1932

INVENTOR
GEORGE A. BIGGS.
BY
ATTORNEYS

Patented Jan. 9, 1934

1,942,995

UNITED STATES PATENT OFFICE 1,942,995

HYDRAULIC TURBINE

George A. Biggs, Springfield, Ohio, assignor to The James Leffel & Company, Springfield, Ohio, a corporation of Ohio Application June 21, 1932. Serial No. 618,494

8 Claims. (Cl. 253—117)

My invention relates to hydraulic turbines.

It is my object to provide an injection turbine in which I inject a part of the water flow out of the inferior surfaces of the runner blades or buckets in order to make water adhere to these surfaces which is particularly desirable on high speed runners where they have wide blade spacing and where it is a common difficulty that water does not cling to the inferior sides of the buckets effectively especially at part gate opening.

It is my object to secure a better distribution of water at part gate opening and, consequently, greater efficiency, together with higher facilities of water with higher speeds, and greater horsepower per unit of diameter.

Referring to the drawing.

Figure 1:
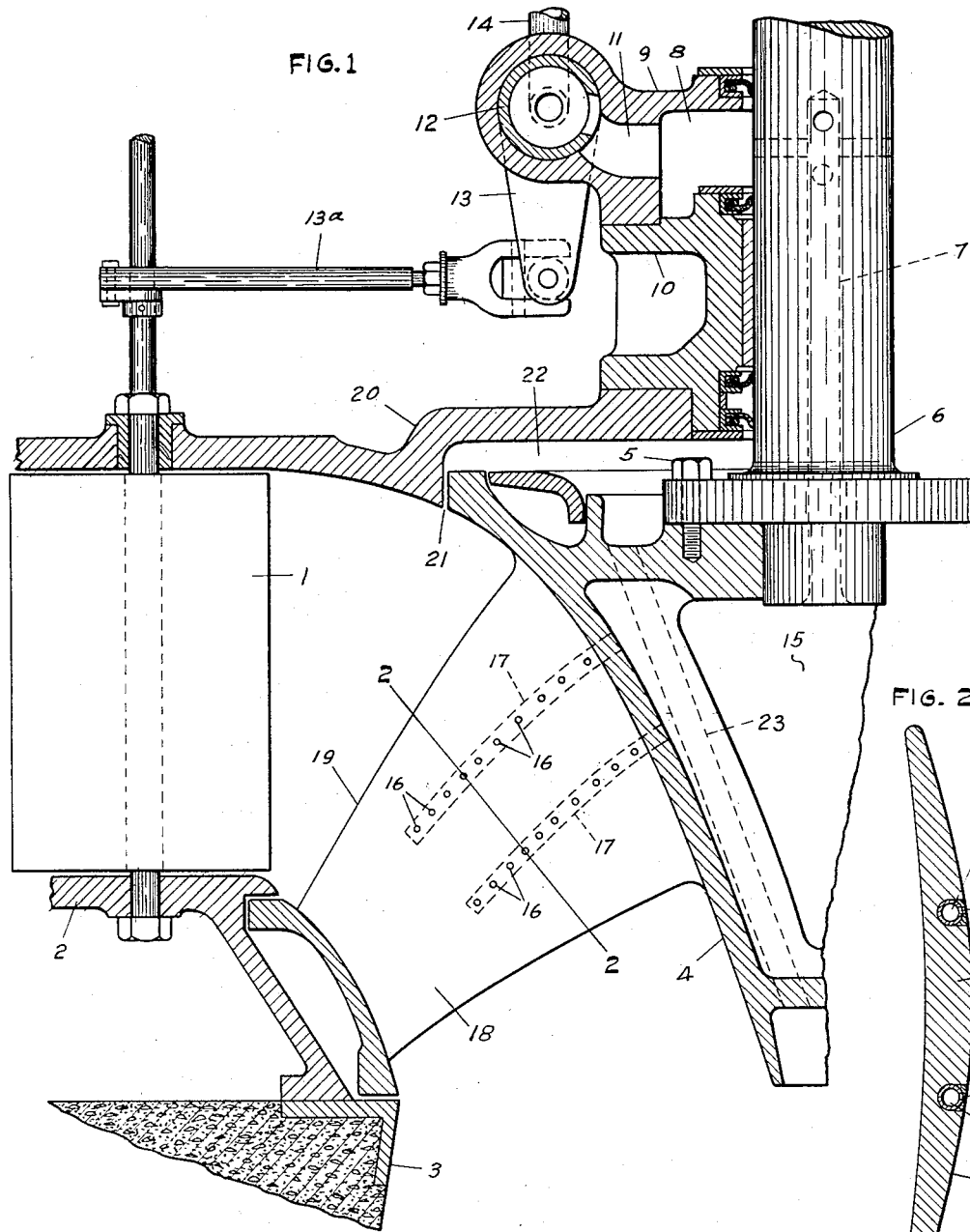
Figure 1 is a quarter section through a typical hydraulic turbine construction constructed to embody the principles of my invention.
Figure 2:
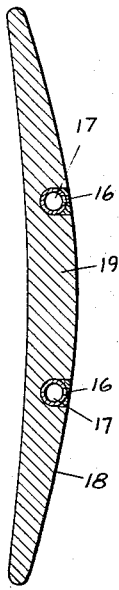
Figure 2 is a section on the line 2—2 of Figure 1 showing the bucket construction having a pipe ported to be mounted in the inferior side of the bucket.

Referring to the drawing in detail, 1 designates the conventional gate arrangement mounted on a gate ring 2. 3 indicates a draft tube. 4 is a runner hub bolted by the bolts 5 to the runner shaft 6. The runner shaft 6 is provided with a passageway 7 connected to a chamber 8 formed by the collar 9 and the collar 10 which act as bearing supports for the runner shaft.

Figure 3:
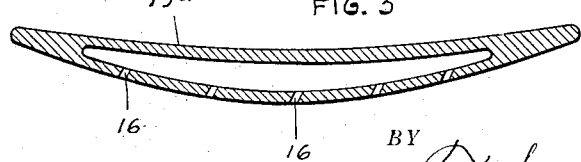
Figure 3 is a section through a hollow type of bucket or vane having discharge holes on the inferior surface..

The collar 9 is provided with a port 11 communicating with the chamber 8 and passageway 7. This port is controlled by the valve 12, valve arm 13 and shaft 13a which is connected to the gate shaft or gate ring operating the gates 1. This valve 12 admits water from the head race or other source through the line 14, passageway 11, chamber 8, passageway 7 into the hollow interior 15 of the hub 4, whence it is discharged through the ports 16 in the pipe passageway 17 on the inferior sides 18 of the runner buckets or blades 19 which are mounted on the hub. If the pipes 17 are not mounted in the buckets 19 any other suitable means may be employed, such as a hollow bucket 19a, as shown in Figure 3, having similar ports 16 preferably directed in the line of flow of the water over the surface of the bucket.

A cap plate 20 forms a cover over the hub 4, from which it is spaced as indicated by the numeral 21. Through this space 21 the water passes into a space 22, beneath the cap plate 20 and between the cap plate 20 and the hub. The water accumulating in the space 22 is drained off through a vent hole 23 extending from the space 22, through the hub, to the bottom thereof.

It will be understood that I desire to comprehend within my invention such modifications as may be necessary to adapt it to varying conditions and uses.

Having thus fully described my invention, what I claim as new and desire to secure by Letters Patent, is:—

1. In a hydraulic turbine, a runner having a shaft, hub and vanes having ports on the inferior side thereof, means of injecting fluid therethrough in the direction of the flow of fluid thereover, means of directing the major portion of fluid over said vanes, including gates, and means interconnected with said gates for regulating the amount of fluid injected through said ports.

2. In a hydraulic turbine, a runner comprising a shaft, a hub and vanes having ports on the inferior sides thereof at spaced intervals, means of delivering fluid for operating the runner over said vanes, means controlled by the fluid delivered for independently delivering additional fluid through the shaft and the ports on the inferior sides of said vanes into the main body of the fluid to cause the main body of the fluid to cling to the inferior sides of the blades.

3. In a hydraulic turbine, a runner comprising a shaft, a hub and vanes having ports on the inferior sides thereof at spaced intervals, means of delivering fluid for operating the runner over said vanes, means controlled by the fluid delivered for independently delivering additional fluid through the ports on the inferior sides of said vanes into the main body of the fluid to cause the main body of the fluid to cling to the inferior sides of the blades, said ports being so arranged as to increase the amount of injection through said ports as the amount of fluid in the main body of fluid decreases as it is controlled by the gates.

4. In combination, a runner having a hollow shaft, hollow hub and buckets having ports therein communicating with said hollow hub, means of applying fluid to the exterior of said buckets and hub, means of applying fluid to the interior of said runner shaft, hub and buckets for discharging through the ports in said buckets into the main body of fluid, and gates having means operatively connected thereto for regulating the quantity of the main body of fluid and the proportion of the body of fluid ejected through the ports in the buckets.

5. In combination, a runner having a hollow shaft, hollow hub and buckets having ports therein communicating with said hollow hub, means of applying fluid to the exterior of said buckets and hub, means of applying fluid to the interior of said runner shaft, hub and buckets for discharging through the ports in said buckets into the main body of fluid, and gate means for regulating the quantity of the main body of fluid and the proportion of the body of fluid ejected through the ports in the buckets, said gate means comprising a gate, a valve for controlling the introduction of fluid into said runner shaft and means interconnecting said valve to said gates.

6. In combination, a turbine runner comprising a shaft, hub and buckets, means of conveying the main body of fluid over said buckets, and gates having means operatively connected thereto for diverting a part of said fluid into said hub and into said buckets and out of ports in the inferior sides of said buckets.

7. In combination, a turbine runner comprising a shaft, hub and buckets, means of conveying the main body of fluid over said buckets, and gates having means operatively connected thereto for diverting a part of said fluid into said hub and into said buckets and out of ports in the inferior sides of said buckets, said runner hub and shaft being hollow and communicating with the ports in said bucket whereby fluid is injected therethrough to cause the water in the main body of water to cling to the inferior sides of said buckets.

8. In combination, a turbine runner comprising a shaft, hub and buckets, means of conveying the main body of fluid over said buckets, gate means for controlling the amount of fluid delivered to the buckets, means of diverting a part of said fluid into said hub and into said buckets and out of ports in the inferior sides of said buckets, said runner hub and shaft being hollow and communicating with the ports in said bucket whereby fluid is injected therethrough to cause the fluid in the main body of water to cling to the inferior sides of said buckets, and valve means interconnected with the gate means for controlling the application of fluid from the main body of fluid delivered into the hub.

GEORGE A. BIGGS.